United States Patent
Tokizono et al.

(10) Patent No.: US 6,930,849 B2
(45) Date of Patent: Aug. 16, 2005

(54) DISK DRIVE UNIT, CONTROLLER FOR ACTUATOR, AND METHOD FOR CONTROLLING HARD DISK DRIVE AND DISK DRIVE UNIT

(75) Inventors: Akira Tokizono, Kanagawa-ken (JP); Shiroh Aono, Kanagawa-ken (JP); Shunichiro Ota, Tokyo (JP); Toshiro Unoki, Yokohama (JP); Minoru Hashimoto, Fujisawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 259 days.

(21) Appl. No.: 10/289,602

(22) Filed: Nov. 7, 2002

(65) Prior Publication Data

US 2003/0086200 A1 May 8, 2003

(30) Foreign Application Priority Data

Nov. 8, 2001 (JP) .................................... 2001-343822

(51) Int. Cl.7 .......................... G11B 21/02; G11B 5/596
(52) U.S. Cl. ...................................... 360/75; 360/78.08
(58) Field of Search ................................ 360/75, 78.04, 360/78.07, 78.08, 78.01; 710/8

(56) References Cited

U.S. PATENT DOCUMENTS

| 4,882,671 | A | * | 11/1989 | Graham et al. ................. 711/4 |
| 5,200,867 | A | * | 4/1993 | Albrecht et al. ......... 360/234.1 |
| 5,941,998 | A | * | 8/1999 | Tillson ........................ 714/54 |
| 5,963,392 | A | * | 10/1999 | Sri-Jayantha et al. ......... 360/75 |
| 6,687,077 | B1 | * | 2/2004 | French et al. ............ 360/73.03 |

* cited by examiner

Primary Examiner—David Hudspeth
Assistant Examiner—Mitchell Slavitt
(74) Attorney, Agent, or Firm—Bracewell & Giuliani LLP

(57) ABSTRACT

In a hard disk drive where data is read from and written to a magnetic disk by a magnetic head in accordance with a command from a host computer, a moving distance of the magnetic head in a radial direction is detected within a predetermined period of time. The magnetic head is moved for seeking by a predetermined distance when the moving distance detected is small. The system and method of the present invention reduces write failures due to the undulation of a lubricant film on the magnetic disk by effectively preventing undulation.

9 Claims, 9 Drawing Sheets

(a)

(b)

DISK DRIVE UNIT, CONTROLLER FOR ACTUATOR, AND METHOD FOR CONTROLLING HARD DISK DRIVE AND DISK DRIVE UNIT

This application claims the priority of Japanese Patent No. JP2001-343822 (IBM Docket No. JP920010345JP1), filed on Nov. 8, 2001, and entitled "Disk Drive Unit, Controller for Actuator, and Method for Controlling Herd Disk Drive and Disk Drive Unit."

BACKGROUND OF THE INVENTION

1. Technical Field

The present invention relates in general to a disk drive unit and, in particular, to a system and method for controlling a hard disk drive and disk drive unit.

2. Description of the Related Art

A hard disk drive (hereinafter, a HDD), which is most commonly used as data storage means for computers, comprises a single or multiple magnetic disks on the same shaft, which is or are rotated by a spindle motor. Data reading and writing is performed by a magnetic head that is placed facing the magnetic disk, wherein the magnetic head is driven by an actuator, which is typically a voice coil motor (hereinafter, a VCM). The magnetic disk, magnetic head and actuator are accommodated in a chassis called disk enclosure. The disk enclosure is composed of a thin box-shaped aluminum alloy base and a top cover for sealing an opening of the base.

Some of the magnetic heads for data reading and writing comprise discretely a transducer for data writing and magnetization means for data reading. As magnetization means for data reading, what utilizes magnetoresistive (MR) effects or giant magnetoresistive (GMR) effects has been developed. The magnetization means for data reading that employs MR or GMR effects allows increasing the recording density since it is difficult to be affected by the noise.

A magnetic head is supported in place on a member called slider. Accordingly, a term "slider" may refer to what includes the magnetic head or sometimes refers to a magnetic head itself. Namely, a magnetic head and slider are sometimes recognized as equivalents. When the magnetic head reads data from or writes data to the magnetic disk, the magnetic head (i.e., slider) flies over the surface of the disk at a predetermined amount. This flying of the magnetic head over the magnetic disk is caused by an air bearing induced above the magnetic disk by the rotation of the disk. In connection with this, the surface of the slider facing the magnetic disk is called air bearing surface (hereinafter, an ABS), whose aspects has a great influence on the flying of the slider.

The flying height of the slider over the magnetic disk is preferably small when giving greater importance to data reading and writing. This is because magnetic interactions between the magnetic disk and the magnetic head can be thoroughly ensured. Therefore, it is desirable for high-density magnetic recording that a slider with a low flying height is employed.

3. Problems to be Solved by the Invention

When performing data reading and writing using a slider with a low flying height, write failures called jamming write have been observed as shown in FIG. 10. It turned out that this phenomenon particularly occurs when the magnetic head has been engaged in the track following operation near a certain cylinder for a long time. It is therefore an object of the present invention to reduce write failures.

SUMMARY OF THE INVENTION

In one embodiment of the present invention, a liquid lubricant is coated on the surface of the magnetic disk. This lubricant lies between the magnetic disk and the slider (i.e., head) to suppress abrasion when the slider slides over the magnetic disk. However, as mentioned above, as the flying height of the magnetic head has recently decreased such as to 20 nm or less by employing a negative pressure slider, the terminus of lubricant molecules on the magnetic disk may contact the flying slider, which causes the phenomenon where the slider vibrates significantly up and down at its natural frequency (200 KHz to 300 KHz). The contact of the terminus of lubricant molecules with the flying slider is considered to take place when the coating condition of the lubricant with liquidity becomes nonuniform.

As mentioned above, as the storage capacity of magnetic disks has recently increased, the number of data sectors residing on one track has reached several hundreds. This results in the fact that read and write commands for the hard disk drive from a host system causes track following of the head around a certain cylinder for a long time depending on applications of the hard disk drive.

The present inventor has found that if such a condition continues, there occurs undulation of the lubricant film in a strip-shaped area on the magnetic disk that has been traced by the movement of the slider, where thin and thick areas of the lubricant film, which should be essentially smoothed, are alternately formed. It is inferred that the jamming write is caused by this undulating lubricant film operating as follows: the lubricant adheres to both sides of the ABS when the slider is located over the lubricant film in which thin and thick areas have been formed alternately. When receiving a seek command to the adjacent track when the adherent lubricant has been accumulated to a certain degree, lumps of the adherent lubricant may fall on the magnetic disk due to the impact of the head movement. The lubricant fallen forms big hill-shaped protrusions, which makes the flying height of the slider unstable when the slider contacts them during its track following. This causes the jamming write resulting in write failures when it occurs while performing host commands for writing.

Even when a head performs track following for a long time around a certain cylinder, the head need not remain around that cylinder unless read or write commands form the host exist. Therefore, in such cases, it is possible to prevent the lubricant film from undulating by performing seek operations of the slider independently of a command from the host. It has been found that even when the undulation of the lubricant film occurs, the undulation can be dissolved or prevented from its occurrence by applying the pressure or airflow occurring between the slider and the magnetic disk to the lubricant film. To that end, it is necessary to cause the slider to perform a predetermined seek operation.

The present invention is based on the above knowledge and considerations and provides a disk drive unit, which comprises a rotatable disk storage medium; a slider including a head for reading and writing data to the disk storage medium in accordance with a command from a host; an actuator for moving the slider over the disk storage medium for a seek operation; and a controller for monitoring a seek distance of the slider within a predetermined period of time.

As for the disk drive unit of the present invention, the controller monitors the seek distance of the slider, where the seek distance monitored becomes an index of whether the head has been involved in the track following for a long time around a certain cylinder. Based on this index, the actuator is driven so as to prevent the head from remaining around the certain cylinder for a long time.

Accordingly, the controller of the present invention controls the actuator such that the slider is moved a distance more than the width of the slider depending on the seek distance of the slider within the predetermined period of time. Namely, depending on whether the seek distance of the slider within a predetermined period of time, for example, an average of all of the seek distances within a predetermined period of time, is smaller than the width of the slider or a little more, the slider is to be moved a distance greater than the width thereof for the seek operation.

Thus, the controller controls the actuator independently of the command from the host such that the slider is moved a distance greater than the width thereof for the seek operation. Namely, this seek operation is performed independently by the disk drive unit even when no read or write command from the host exists.

For the disk drive unit of the present invention, it is desirable that when receiving a write command from the host while the controller is monitoring the seek distance of the slider within the predetermined period of time, data having been written in accordance with the write command be read back in order to verify whether the write operation has been properly performed. When the jamming write is detected by the verify operation, the write operation is to be performed once again.

In another aspect of the present invention, there is provided a disk drive unit, comprising: a rotatable disk storage medium; a slider including a head for reading and writing data to the disk storage medium in accordance with a command from a host; and an actuator for moving the slider over the disk storage medium for a seek operation, wherein the actuator causes the slider to perform a first seek operation accompanied by read and write operations and a second seek operation accompanied by no read and write operations.

The above disk drive unit can cause the slider to perform the second seek operation accompanied by no read and write operations, so that the undulation or protrusions of the lubricant film may be prevented or suppressed.

In the disk drive unit of the invention, it is desirable that the actuator performs the second seek operation at a slower speed than the first seek operation. As mentioned above, the second seek operation accompanied by no read and write operations can be performed independently of the command from the host. In other words, the second seek operation is to be performed while no commands are issued by the host. In this period, the electric power of the host may be possibly turned off. This power off is a sudden occurrence to the disk drive unit, therefore, if the slider is performing a seek operation with a fast speed at that time, the seek operation can not be controlled any more after that, resulting in the slider running into a crash stop provided in the disk drive unit or the slider colliding with the disk surface as a reaction thereof. This is why the second seek operation is performed with a slower speed. It should be noted that the slower speed is defined on the basis of a maximum speed in the first seek operation since the speed of the first seek operation varies depending on the seek distance. In this case, the second seek operation is performed with a speed that is sufficiently slower than the maximum speed in the first seek operation, for example, less than 30%, 20% or 10% thereof.

The second seek operation is intended to smooth the lubricant film formed on the surface of the disk storage medium, for which the speed of the seek operation is desirably much slower.

In addition, in the disk drive unit of the invention, it is desirable that the actuator performs the second seek operation so as to move the slider intermittently. In accordance with the intermittent movement, the slider repeats acceleration and deceleration. Owing to the vibration caused to the slider due to this acceleration and deceleration, adhesion of the lubricant to the slider may be possibly prevented or the adherent lubricant may fall. Moreover, in the disk drive unit of the invention, it is desirable that the actuator performs the second seek operation such that the slider traverses the disk storage medium in a radial direction. Since the present invention is based on the assumption that the disk storage medium is rotating, the slider will move over the entire disk surface of the disk storage medium when it traverses the disk in a radial direction. Consequently, smoothing of the lubricant film by the second seek operation will be performed over the entire surface of the disk storage medium. It is noted that the disk storage medium has an area where no data is stored, which is not necessarily subject to the second seek operation described above.

In a further aspect, the present invention provides a control unit for an actuator of a disk drive unit described above. This control unit for the actuator is what moves a head element for a seek operation, wherein the head element reads and writes data to a disk storage medium in accordance with a command from a host. The control unit comprises: a timer for accumulating time between the commands; and a controller for directing the actuator such that the head element performs a seek operation over the disk storage medium in accordance with a predetermined pattern based on the time accumulated by the timer.

The control unit for the actuator according to the invention is to perform seek operations when the accumulated time reaches a predetermined time. Therefore, even if the undulation or protrusions of the lubricant film occurs, they will be dissolved. This seek operation is performed in accordance with a predetermined pattern. For example, the pattern is such that the head element is moved for seek operations from an outer circumference of the disc storage medium as a starting point toward an inner circumference or vice versa. In another aspect, the pattern is such that the head element is moved for seek operations from a halfway point of the disk storage medium as a starting point toward the inner circumference and then to the halfway point again toward the outer circumference. With such a seek pattern mentioned above, the head element can move over the disk storage medium exhaustively.

It is supposed that the command from the host may be received while performing the seek operation in accordance with the predetermined pattern. In this case, the controller preferably interrupts the seek operation and resumes it after the command from the host has been processed, in order to prevent performance degradation of the disk storage medium due to smoothing operations for the lubricant film.

A typical application of the present invention includes hard disk drives. A hard disk drive according to the present invention comprises: a magnetic disk on a surface of which a lubricant film is formed; a head for reading and writing data to the magnetic disk; a slider for supporting the head and which has a slider surface facing the magnetic disk; and a voice coil motor for moving the slider over the magnetic disk in a radial direction, wherein a smoothing operation for the lubricant film is performed by moving the slider for seek operations in a radial direction without being accompanied by read and write operations.

In the bard disk drive of the invention, the smoothing operation preferably comprises moving the slider such that continual protrusions of the lubricant film are prevented from being generated, in which the protrusions would otherwise be generated in a circumferential direction of the magnetic disk by the slider remaining in place over the magnetic disk.

The smoothing operation is implemented such that the pressure generated on the slider surface with the rotation of the magnetic disk is applied to the lubricant film. This pressure is to smooth the undulated lubricant film.

In a further aspect of the present invention, there is provided a method for controlling a disk drive unit that reads and writes data to a rotatable disk storage medium using a read/write head in accordance with a command from a host, comprising the steps of: detecting a moving distance of the read/write head in a radial direction within a predetermined period of time; and seeking the read/write head a predetermined distance based on the moving distance.

In the aforementioned method, the seeking step is preferably performed after it has pass a predetermined period of time during which no commands are received from the host.

In a further aspect of the present invention, there is provided a method for controlling a disk drive unit that reads and writes data to a rotatable disk storage medium using a read/write head in accordance with a command from a host, comprising the steps of: accumulating time during which no data reading and writing is performed in accordance with the command from the host; and seeking the read/write head by traversing the disk storage medium in a predetermined area based on the accumulated time. The predetermined area encompasses a data storage area of the disk storage medium. The seek speed is desirably slower than that for data reading and writing in terms of the same seek distance.

DETAILED DESCRIPTION OF THE INVENTION

Figure 1:
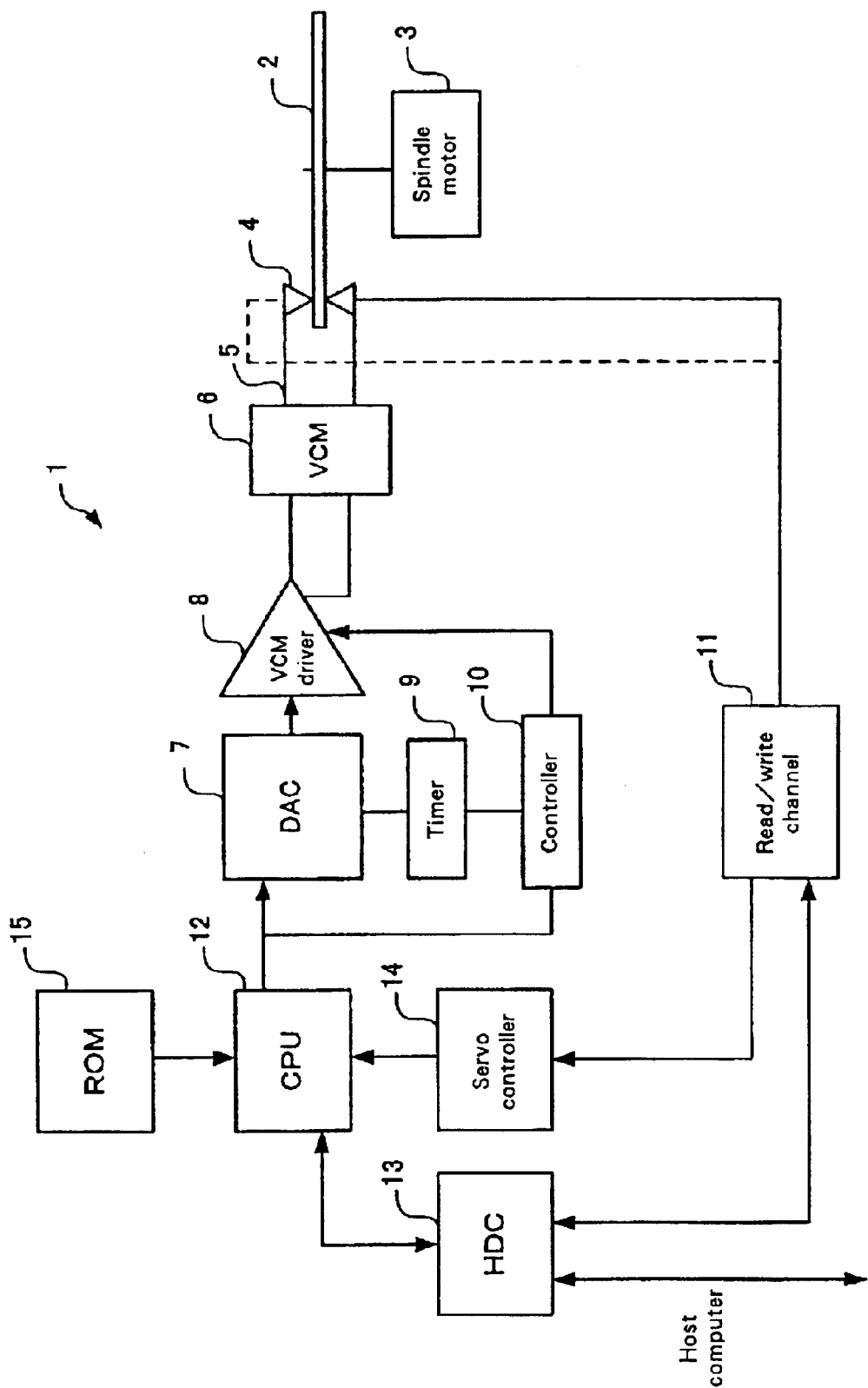
FIG. 1 is a block diagram illustrating a principal part of a hard disk drive of the embodiment of the present invention

FIG. 1 is a block diagram illustrating a principal part of hard disk drive 1. Hard disk drive 1 is a data storage and regeneration device, wherein a magnetic head 4 seeks over a magnetic disk 2 rotated by a spindle motor 3 and then remains in place for writing data to magnetic disk 2 or reading data written to magnetic disk 2. Magnetic disk 2 may be provided one or more as required, although a single disk is provided in the embodiment of the invention.

Magnetic disk 2 is rotated on a spindle shaft of a spindle motor 3 when hard disk drive 1 is operating, while being stopped (i.e., stands still) when hard disk drive 1 is inactive. On the surface of magnetic disk 2 are provided multiple positional information (i.e., servo information) storage areas in a radial direction of magnetic disk 2, while data storage areas are formed in other areas. A position of magnetic head 4 is detected by magnetic head 4 reading the servo information. The servo information is composed of track identification data and a burst pattern. The track identification data represents a track address of each data track. A current track position of magnetic head 4 is detected by magnetic head 4 reading the track identification data. The burst patterns, where signals are recorded, are arranged at predetermined spaces apart in a radial direction of magnetic disk 2, and are comprised of multiple strings of signal storage areas whose phases differ each other. An amount of displacement of magnetic head 4 with respect to data tracks is determined based on the signals output from these burst patterns.

Two magnetic heads 4, which is supported by the slider, are provided at the end of actuator 5 on both sides of magnetic disk 2. Magnetic head 4 is to read and write data to magnetic disk 2 and further read servo information written in magnetic disk 2. Magnetic head 4 integral with actuator 5 moves in a radial direction of magnetic disk 2. A ramp (not shown), at which magnetic head 4 evacuates when inoperative, is provided outside of magnetic disk 2. It should be noted that what is shown by 4 in FIG. 1 may be herein called magnetic head 4 or slider 4 depending on the context of the description. A read/write channel 11 performs read/write processing of data. Namely, it transforms write data transferred via HDC 13 from a host computer to write signals (i.e., currents) and supplies to magnetic head 4. Magnetic head 4 performs writing of data to magnetic disk 2 on the basis of this write current. On the other hand, read/write channel 11 transforms read signals (i.e., currents) read from magnetic disk 2 to digital data and outputs to the host computer via HDC 13. This digital data also contains servo information.

Servo controller 14 extracts servo information from read data output from read/write channel 11. As mentioned before, servo information includes track identification data and burst patterns. Servo controller 14 transfers extracted servo information to CPU (central processing unit) 12.

Actuator 5 is driven by voice coil motor (VCM) 6. Therefore, it can be also considered that VCM 6 drives magnetic head 4. VCM 6 is comprised of a moving part including a coil and a stationary part including a permanent magnet, where the moving part is driven by VCM driver 8 supplying a predetermined current to the coil, whereby slider 4 is moved or stopped in place over magnetic disk 2.

HDC (hard disk controller) 13 acts as an interface for hard disc drive 1. One of its functions is to receive write data from a host computer and then transfer to read/write channel 11. It also transfers read data received from read/write channel 11 to the host computer. HDC 13 further receives commands from the host computer and then transfers to CPU 12.

CPU 12 is responsible for controlling hard disk drive 1 together with HDC 13. Accordingly, it performs movement, i.e., speed control of slider 4. CPU 12 interprets and executes programs stored in ROM (read only memory) 15. CPU 12 determines a position of magnetic head 4 based on servo information transferred from servo controller 14 and outputs speed control values for slider 4 to a digital/analog converter (DAC) 7 based on a deviation of the position of magnetic head 4 from a target position. The speed control values for a move directive for slider 4 are output whenever servo information is read by magnetic head 4. In principle, servo information is read at regular intervals, thus the speed control values are also essentially output at regular intervals, i.e., intermittently based on this servo information.

DAC 7 converts the speed control values output from CPU 12 to analog signals (i.e., voltage signals) and then outputs to VCM driver 8. VCM driver 8 transforms voltage signals received from DAC 7 to drive currents and then supplies to VCM 6.

A timer 9 supplies time information to a controller 10. It should be noted that timer 9 is shown separately from controller 10 in this example, however, controller 10 itself may include a function of timer 9. Namely, a controller of the present invention may be comprised of timer 9 and controller 10.

Controller 10 of bard disk drive 1 monitors an average of the total seek distance within a past predetermined time. Controller 10 receives servo information from CPU 12 and determines a seek distance based on this servo information. On the other hand, controller 10 receives time information from timer 9 and calculates and monitors an average of the total seek distance (i.e., average seek distance L) within a past predetermined time. Assuming that the total seek distance is Ls and the predetermined time is Ts, the average seek distance L is given as L=Ls/Ts.

If the average seek distance Ls is smaller than the width of slider (Ws), that is, L<Ws, controller 10 considers that slider 4 has remained around a certain cylinder for the predetermined time, so that it is placed on alert for the accumulation of lubricants.

Being placed on alert as described above, controller 10 monitors whether any command accompanied by seek operations, typically a read or write command, has been transferred from a host computer via HDC 13 and CPU 12. On the other hand, controller 10 receives time information from timer 9 and directs VCM driver 8 to seek slider 4 in an inward direction from the current cylinder position if no commands have been transferred within a predetermined time (for example, 1 second). This seek operation is performed independently of the commands from the host computer. Moreover, this seek operation performs no data reading or writing to magnetic disk 2.

Figure 2:
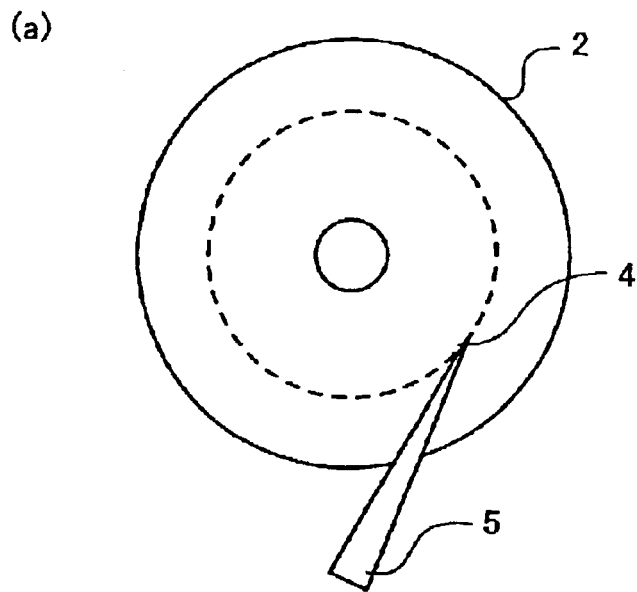
FIGS. 2(a)–(b) depict the seek operation for moving a slider in an inward direction of the magnetic disk in an alert condition according the embodiment of the invention.
Figure 2:
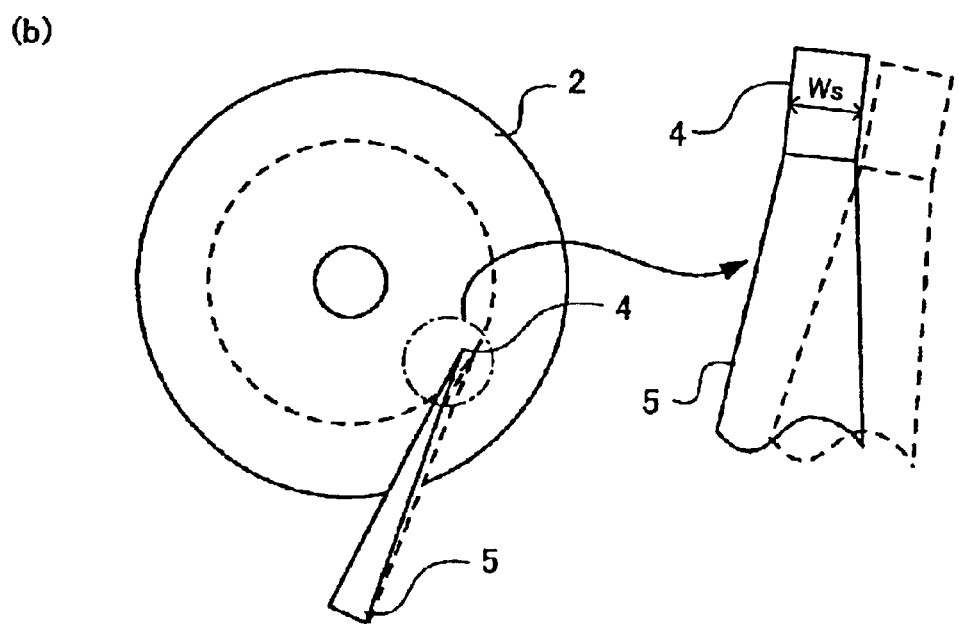

FIG. 2 depicts the seek operation mentioned above. It is now assumed that slider 4 has remained at a certain cylinder (shown by dotted line) of magnetic disk 2 for a predetermined time, as shown in FIG. 2(a). If no commands causing seek operations have been received from the host computer in this period, slider 4 is moved for seeking by actuator 5 by a distance grater than the width of slider 4, Ws, as shown in FIG. 2(b). The seek distance is, for example, the one that corresponds to 100 cylinders. This seek prevents slider 4 from remaining at a certain cylinder so that the undulation phenomenon of the lubricant film due to its partial protrusions can be prevented.

It should be noted that in this example the seek operation is performed in an inward direction though it may be performed in an outward direction. However, if hard disk drive 1 employs a ramp load/unload feature and actuator 5 becomes out of control by any chance when seeking in an outward direction of magnetic disk 2, it is feared that slider 4 runs into the ramp at a high speed. Therefore, for hard disk drives 1 employing the ramp load/unload feature, the seek operation may be preferably performed in an inward direction of magnetic disk 2.

In addition to the aforementioned seek operation with a predetermined distance in an inward or outward direction, hard disk drive 1 of the embodiment of the invention further performs a seek operation performed exhaustively with respect to magnetic disk 2 in accordance with a predetermined pattern. This seek operation is intended to smooth the lubricant film coated on the surface of magnetic disk 2 and which is also performed independently of commands from a host computer, with being accompanied by no data reading or writing to magnetic disk 2.

In the alert condition mentioned above, time is measured from a time point when a command causing the seek operation is received from a host computer to a time point when a next command causing the seek operation is received. This measurement is performed on the basis of the commands transferred to controller 10 via HDC 13 and CPU 12 and time information obtained from timer 9. The time between the commands from the host computer is defined as drive idle time. Controller 10 accumulates this drive idle time. When the drive idle time reaches three minutes, for example, controller 10 directs actuator 5 to perform operations shown in FIG. 3 when one second has passed after the command was executed. This operation has an effect of smoothing the lubricant film which has partially undulated on magnetic disk 2.

Figure 3:
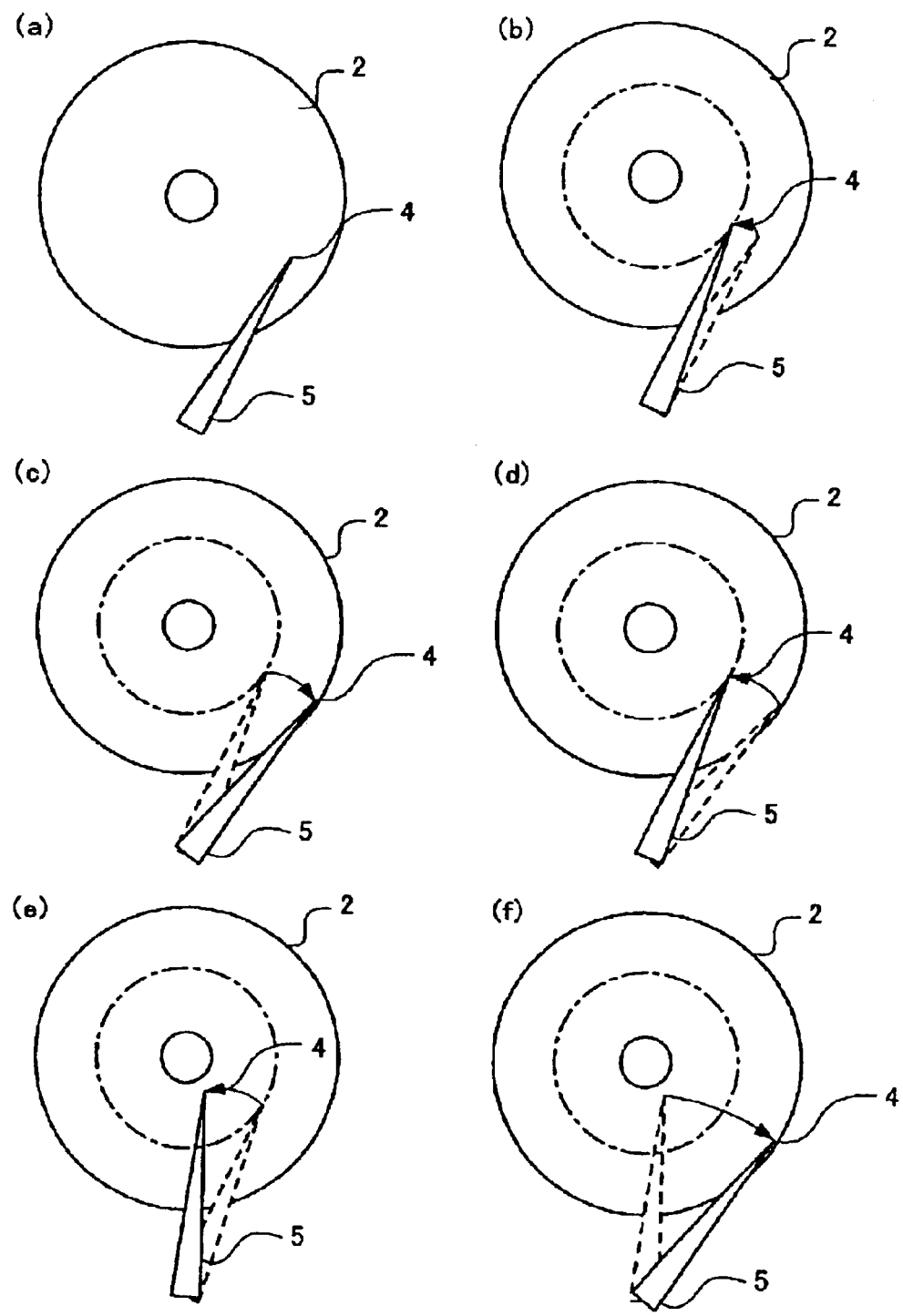
FIGS. 3(a)–(f) depict smoothing operations for the lubricant film by a slider performed during an alert condition according to the embodiment of the invention.

In FIG. 3, FIG. 3(a) shows an initial condition. When the accumulated time of the drive idle time has reached three minutes, for example, slider 4 is moved for seeking from the initial position to a position which corresponds to a middle of the radius of the magnetic disk 2 (hereinafter called the middle of magnetic disk) when one second has passed after the command was executed, as shown in FIG. 3(b). The maximum seek speed for this seek operation is limited to about 10% of that for data reading or writing, for example, 30 cm/sec. Note that in FIG. 3(b) to FIG. 3(f), there is shown a circle by a dashed line in the middle of magnetic disk 2. In addition, there are also shown, in FIG. 3(b) to FIG. 3(f), previous positions of slider 4 and actuator 5 by a dotted line.

Then, slider 4 is moved for seeking from the position shown in FIG. 3(b) in an outward direction, wherein the maximum seek speed is slower than that of FIG. 3(b). For example, slider 4 is moved for seeking up to the outermost cylinder of magnetic disk 2 at a speed of 1 cm/sec. This slow speed seek brings about an effect of smoothing the lubricant film. This operation smoothes an area outside the middle of magnetic disk 2.

After slider 4 reached the outermost cylinder, slider 4 is moved for seeking toward the middle of magnetic disk 2 as shown in FIG. 3(d), wherein the seek speed for this operation is about 10% of that for data reading or writing, for example, 30 cm/sec. After slider 4 reached the middle of magnetic disk 2, slider 4 is moved for seeking in an inward direction of magnetic disk 2 as shown in FIG. 3(e), wherein the seek speed for this operation is limited to 1 cm/sec. This seek operation positions slider 4 at an innermost cylinder of magnetic disk 2 and smoothes an area inside the middle of magnetic disk 2.

Since magnetic disk 2 rotates at a high speed, there occurs predetermined pressure on the surface of slider 4 (i.e., slider surface) facing magnetic disk 2, which is considered to act on the lubricant film to smooth it. Furthermore, as mentioned above, slider 4 is to move over magnetic disk 2 exhaustively traversing magnetic disk 2, which is expected to smooth the lubricant film over the entire area of magnetic disk 2.

The seek operation mentioned needs only to be performed for an area where data is stored, in other words, a region between an innermost cylinder and an outermost cylinder, since this region corresponds to what is subject to seek operations for data reading and writing.

Then, slider 4 is moved for seeking from the innermost cylinder of magnetic disk 2 to the outermost cylinder, as shown in FIG. 3(f), wherein the seek speed for this operation is about 10% of that for data reading or writing, for example, 30 cm/sec. Slider 4 stands by at this position. At this point, a sequence of patterned seek operations has been completed and controller 10 initializes the accumulated time for the drive idle time to zero.

Figure 4:
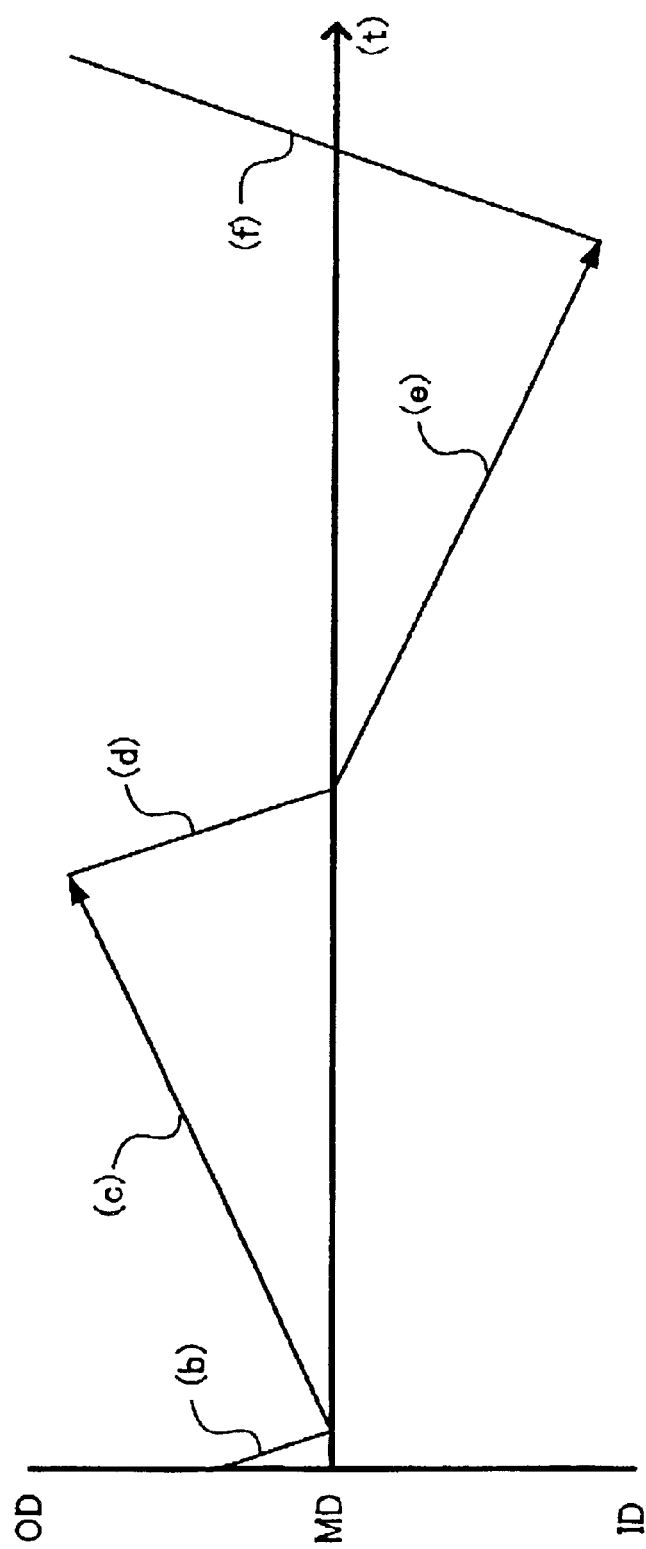
FIG. 4 depicts a graph illustrating a trajectory of a slider for smoothing operations for the lubricant film.

FIG. 4 depicts a graph illustrating patterned seek operations of slider 4 mentioned above. In FIG. 4, the vertical axis indicates positions in a radial direction of magnetic disk 2, while the horizontal axis indicates time (t). Note that OD, MD and ID on the vertical axis represent the outermost cylinder, middle cylinder and innermost cylinder of magnetic disk 2, respectively. Segments (b) to (f) in the drawing correspond to the operations (b) to (f) shown in FIG. 3, respectively.

As shown in FIG. 4, slider 4 is moved for seeking from the initial position to the middle of magnetic disk 2 (shown by segment (b)), and then moved therefrom to the outermost cylinder of magnetic disk 2 (shown by segment (c)). Thereafter, slider 4 is moved to the middle of magnetic disk 2 (shown by segment (d)), and then moved to the innermost cylinder of magnetic disk 2 (shown by segment (e)). In this manner, slider 4 performs patterned seek operations.

Two kinds of seek operations mentioned above are both performed at a slower speed than the regular seek for data reading and writing. This is because electric power may be turned off at any time during the drive idle time. If electric power is turned off during a high speed seek operation, slider 4 may run into a crash stop at a high speed to destroy the disk drive 1 or slider 4 may damage stored information on magnetic disk 2 due to the impact of actuator 5 rebounding. The seek speed from the middle of magnetic disk 2 to the outermost cylinder of magnetic disk 2 and from the middle of magnetic disk 2 to the innermost cylinder of magnetic disk 2 are slower than those from the initial position to the middle of magnetic disk 2 and from the outermost cylinder of magnetic disk 2 to the middle of magnetic disk 2. This is intended to make the smoothing operation of the lubricant film by slider 4 more effective. The seek operation intended to smooth the lubricant film is preferably performed at a slower speed like this.

Figure 5:
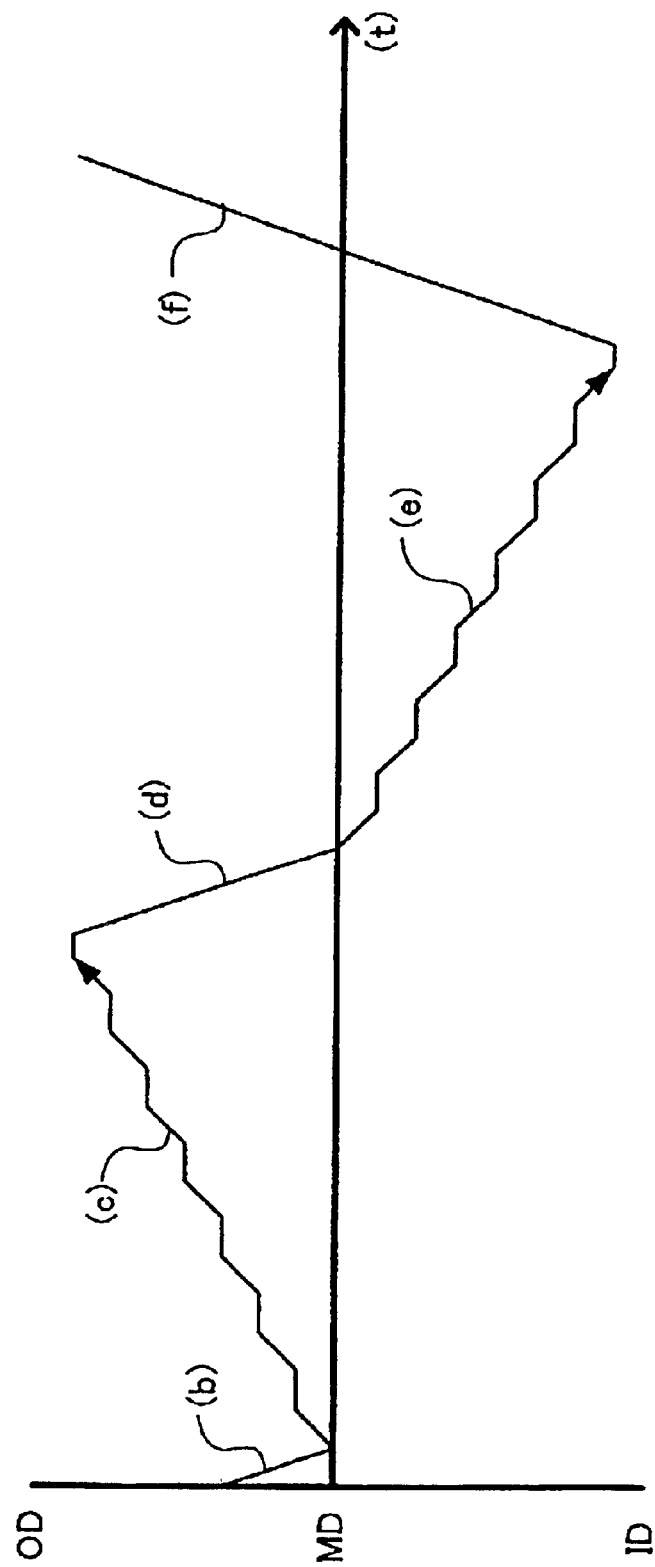
FIG. 5 depicts a graph illustrating another trajectory of a slider for smoothing operations for the lubricant film.

In the above embodiment, the seek operation intended to smooth the lubricant film is performed successively, however, it may be performed intermittently as shown in FIG. 5. For example, seek operations with a short stroke of several cylinders may be performed intermittently in order to reach the targeted innermost or outermost cylinder. According to this intermittent seeks, it is expected that the lubricant adhering to slider 4 falls due to the influence of acceleration and deceleration.

Figure 6:
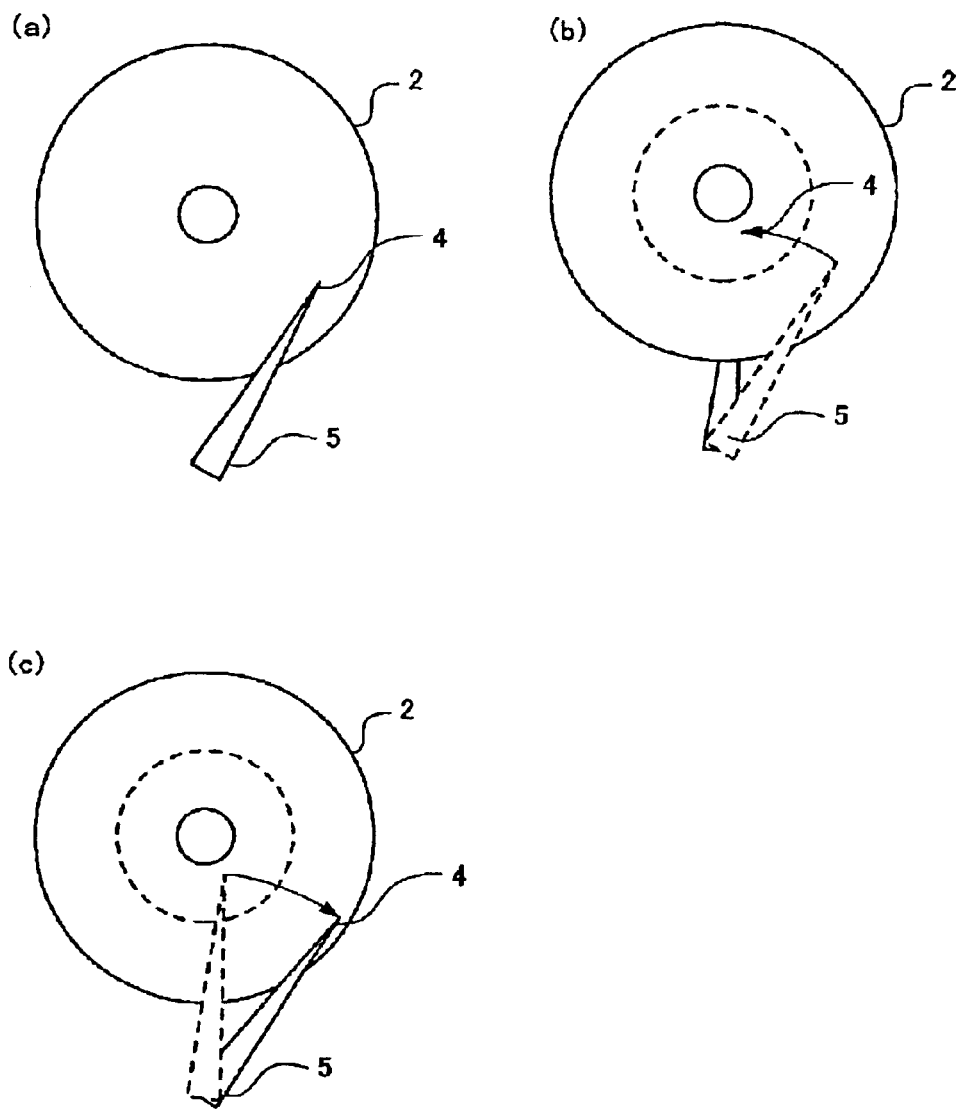
FIGS. 6(a)–(c) depict smoothing operations for the lubricant film by a slider performed during an alert condition according to another embodiment of the invention.

Also, in the above embodiment, a pattern for seeking is employed where slider 4 moves to the outermost or innermost cylinder after moving once to the middle of magnetic disk 2, however, a pattern is not limited only to this one. For example, as shown in FIG. 6, slider 4 may be moved from an initial position shown in FIG. 6(a) directly to an innermost cylinder of magnetic disk 2 shown in FIG. 6(b), and then moved therefrom to an outermost cylinder shown in FIG. 6(c).

When receiving a command from a host computer while slider 4 is performing smoothing operations for the lubricant film, execution of the command is given priority. Therefore, the smoothing operation is once interrupted and will be resumed when one second has passed, for example, after data reading or writing was executed in accordance with that command. It should be noted that the smoothing operation is consistently performed during the drive idle time in order to avoid performance degradation of hard disk drive 1.

For example, when commands are transferred to hard disk drive 1 from a host computer without a break, slider 4 is to be forced to perform smoothing operations for the lubricant film at specified time intervals, for example, at six hours intervals. When receiving a write command during the alert condition mentioned above, it is effective to additionally perform verification processing to read back written data immediately. The verification processing allows to determine as to whether the jamming write has occurred, wherein write operation for that data should be performed again when the jamming write has occurred. This processing may be performed by the cooperation of controller 10, CPU 12 and HDC 13.

Figure 9:
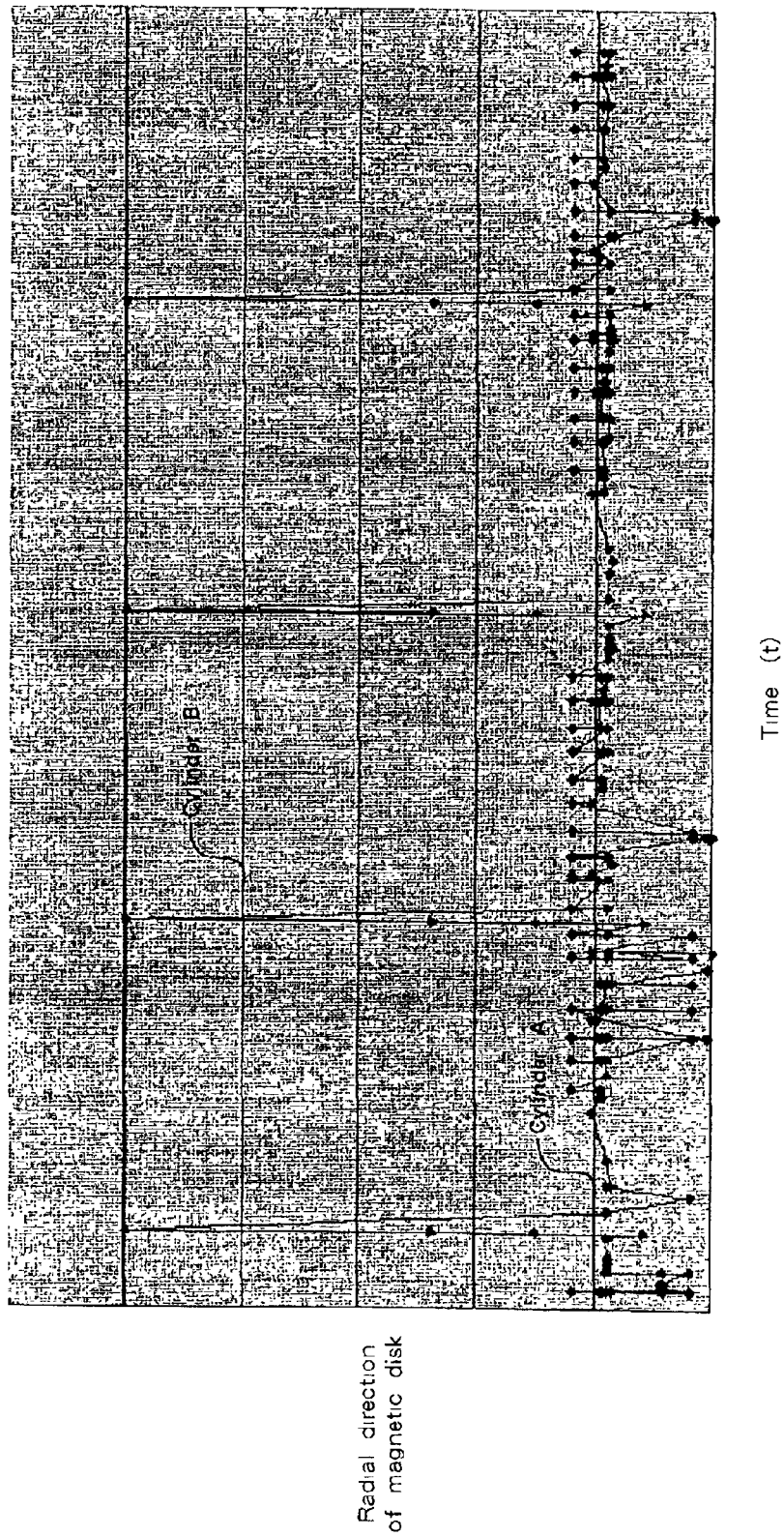
FIG. 9 is a diagram illustrating a trajectory of movement of a slider.
Figure 10:
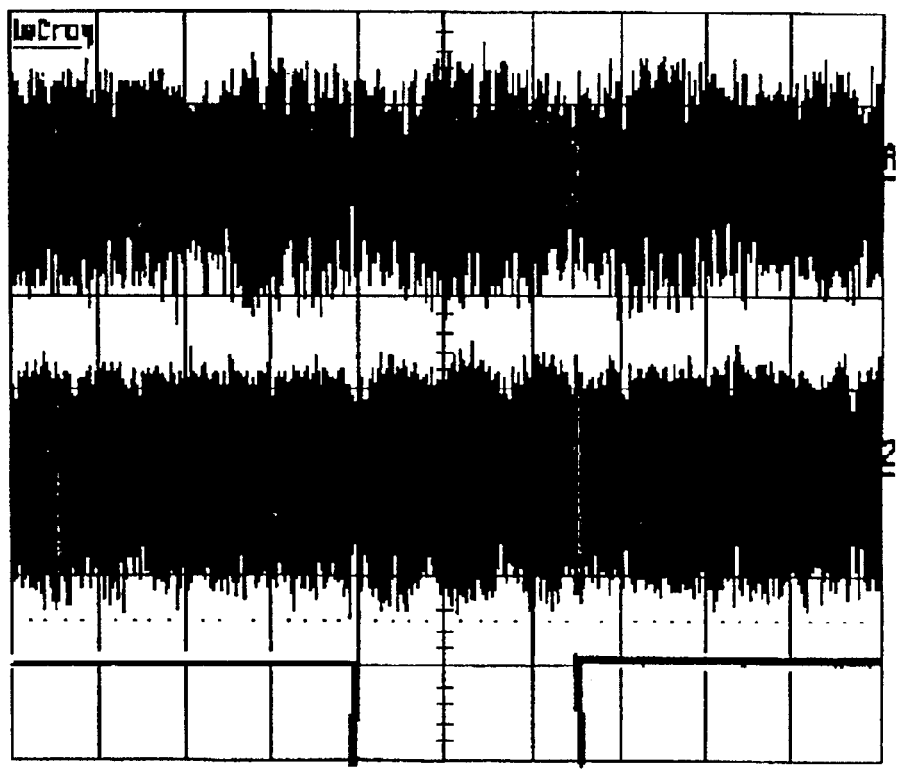
FIG. 10 depicts a current waveform indicating the occurrence of jamming writes.

FIG. 9 is a diagram illustrating an access pattern of slider 4 which is actually performed in hard disk drive 1. As shown in FIG. 9, for this access pattern, slider 4 is located at a cylinder A with 80% of probability. It is also seen that slider 4 moves therefrom for seeking to a cylinder B at specified time intervals.

Figure 8:
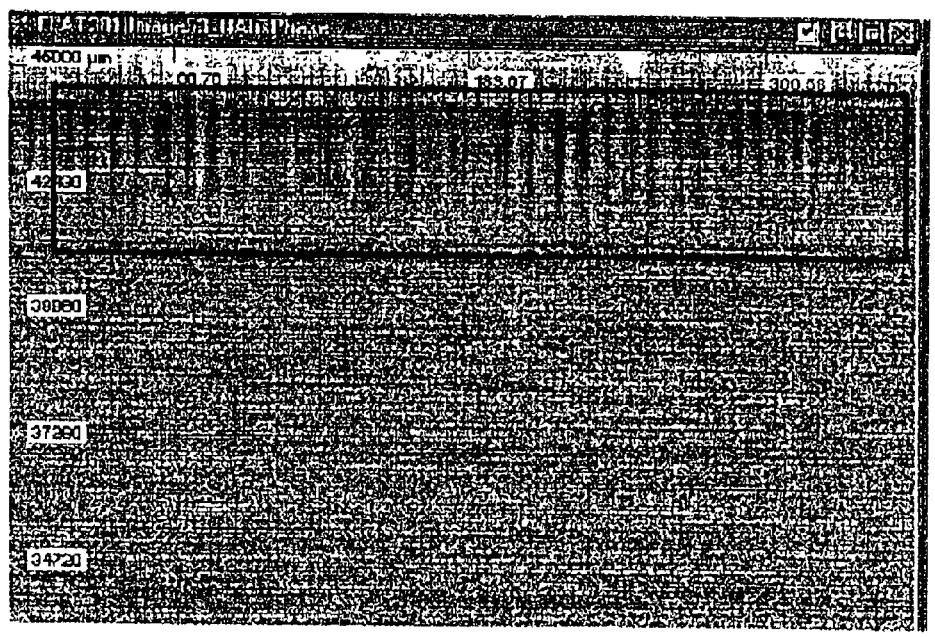
FIG. 8 depicts the observation results of the surface of the lubricant film when no smoothing operations according to the embodiment of the present invention are performed.

As a result of having operated multiple hard disk drives 1 for two weeks continuously in accordance with the above access pattern, it was reported that the jamming write has occurred. FIG. 8 depicts the observation results of the surface of the lubricant film on magnetic disk 4 of hard disk drive 1 where the jamming write has occurred. It is seen that an undulated mottled condition extends with the width of slider 4 around the position of cylinder A.

Figure 7:
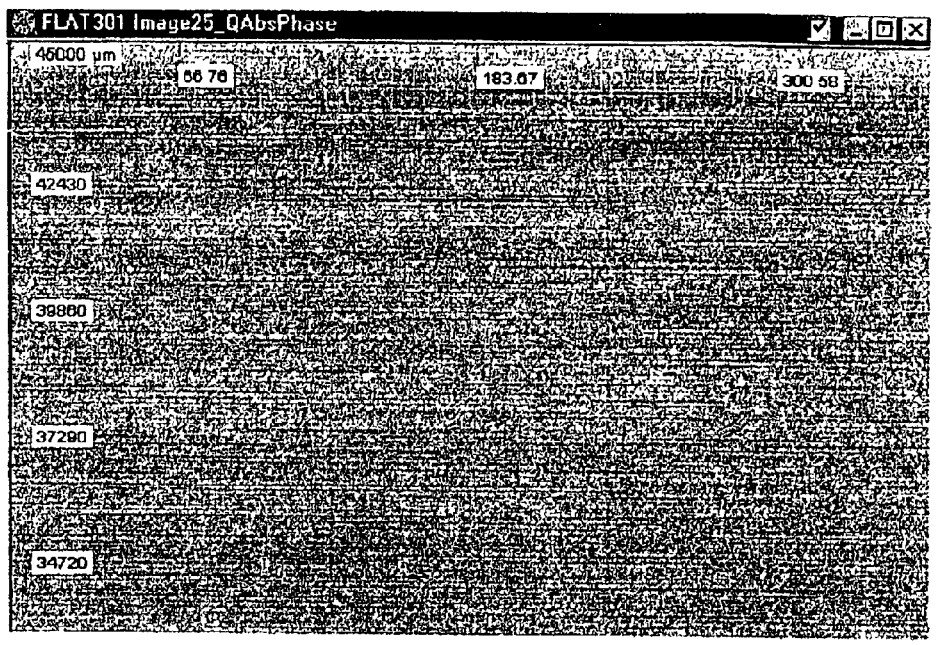
FIG. 7 depicts the observation results of the surface of the lubricant film when smoothing operations according to the embodiment of the present invention are performed.

On the other hand, no occurrence of jamming writes has occurred after having operated multiple hard disk drives 1 for two weeks continuously in accordance with the same access pattern when the seek operations according to the present invention were implemented. FIG. 7 depicts the observation results of the surface of the lubricant film on magnetic disk 4, from which it is seen that the surface of the lubricant film remains flat and smooth. As mentioned above, according to the present invention, write failures due to the undulation of the lubricant film are reduced since the undulation is effectively prevented.

What is claimed is:

1. A disk drive unit, comprising:
   a rotatable disk storage medium;
   a slider including a head for reading and writing data to the disk storage medium in accordance with a command from a host;
   an actuator for moving the slider over the disk storage medium for a seek operation, wherein the actuator causes the slider to perform a first seek operation accompanied by read and write operations and a second seek operation accompanied by no read and write operations; and wherein
   the actuator performs the second seek operation so as to move the slider intermittently.

2. The disk drive unit of claim 1, wherein the actuator performs the second seek operation at a slower speed than the first seek operation.

3. The disk drive unit of claim 1, wherein the actuator performs the second seek operation such that the slider traverses the disk storage medium in a radial direction.

4. A control unit for an actuator for moving a head element for a seek operation, wherein the head element reads and writes data to a disk storage medium in accordance with a command from a host, the controller comprising:
- a timer for accumulating time between the commands;
- a controller for directing the actuator such that the head element performs a seek operation over the disk storage medium in accordance with a predetermined pattern based on the time accumulated by the timer; and wherein
- the controller establishes the predetermined pattern such that the head element moves over the disk storage medium exhaustively.

5. The control unit of claim 4, wherein the controller directs the actuator to interrupt the seek operation when the command from the host is received while performing the seek operation in accordance with the predetermined pattern and to resume the seek operation after the command from the host has been processed.

6. A method for controlling a disk drive unit that reads and writes data to a rotatable disk storage medium using a read/write head in accordance with a command from a host, comprising the steps of:
- detecting a moving distance of the read/write head in a radial direction within a predetermined period of time;
- seeking the read/write head a predetermined distance based on the moving distance; and wherein
- the seeking step is performed after a predetermined period of time has passed during which no commands are received from the host.

7. A method for controlling a disk drive unit that reads and writes data to a rotatable disk storage medium using a read/write head in accordance with a command from a host, comprising the steps of:
- accumulating time during which no data reading and writing is performed in accordance with the command from the host; and
- seeking the read/write head by traversing the disk storage medium in a predetermined area based on the accumulated time.

8. The method of claim 7, wherein the predetermined area encompasses a data storage area of the disk storage medium.

9. The method of claim 7, wherein the seek speed is slower than that for data reading and writing in terms of the same seek distance.

* * * * *

UNITED STATES PATENT AND TRADEMARK OFFICE
CERTIFICATE OF CORRECTION

PATENT NO. : 6,930,849 B2
DATED : August 16, 2005
INVENTOR(S) : Akira Tokizono et al.

It is certified that error appears in the above-identified patent and that said Letters Patent is hereby corrected as shown below:

Column 12,
Line 5, please insert the words -- it has pass -- between the words "after" and "a".

Signed and Sealed this

Fourth Day of October, 2005

JON W. DUDAS
*Director of the United States Patent and Trademark Office*